J. B. JOHNSON.
CULTIVATING TOOL.
APPLICATION FILED AUG. 25, 1914.
1,134,538.
Patented Apr. 6, 1915.
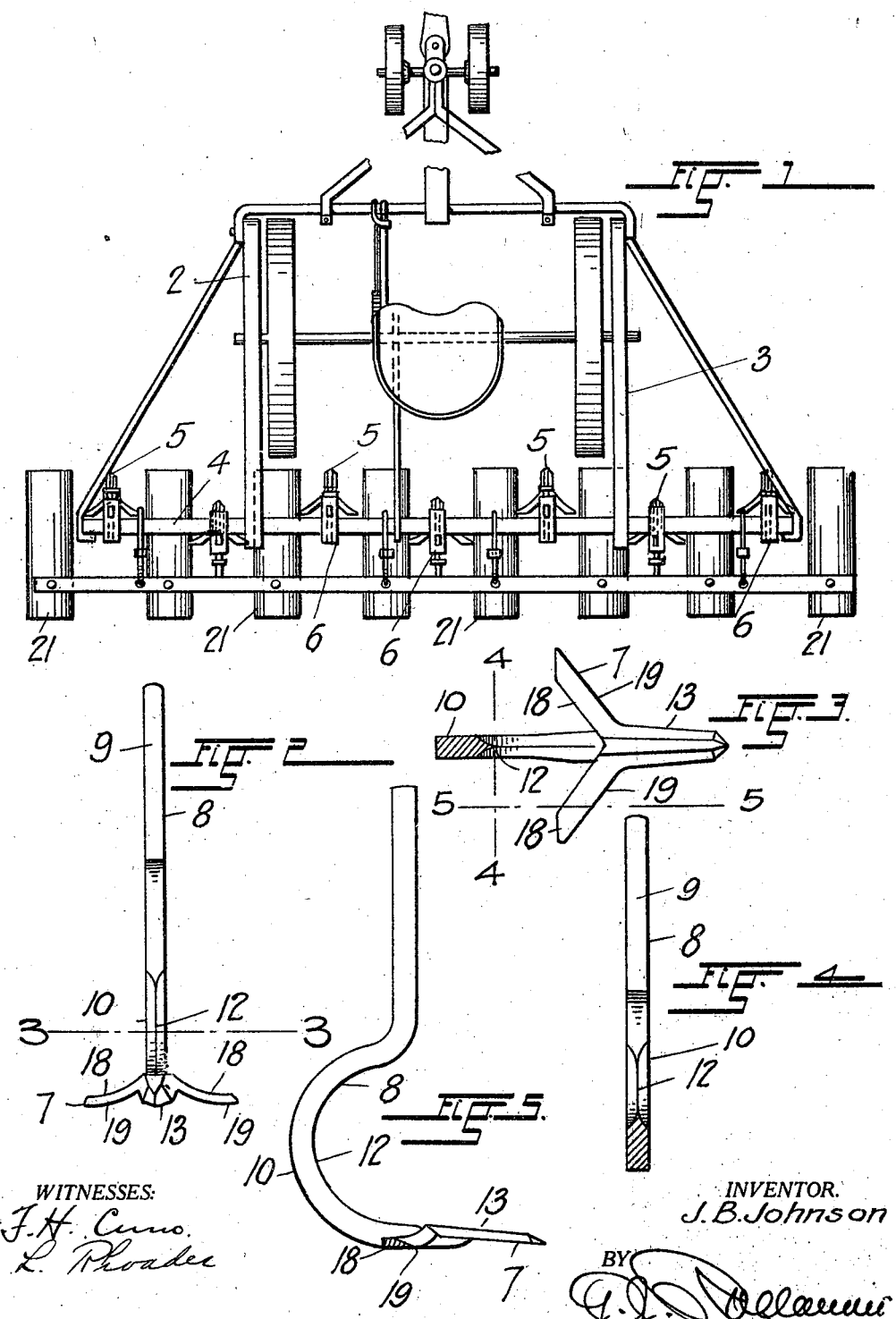
WITNESSES:
INVENTOR.
J. B. Johnson
BY
ATTORNEY.

UNITED STATES PATENT OFFICE.

JOHN B. JOHNSON, OF FORT COLLINS, COLORADO.

CULTIVATING-TOOL.

1,134,538.

Specification of Letters Patent.

Patented Apr. 6, 1915.

Original application filed July 7, 1914, Serial No. 849,379. Divided and this application filed August 25, 1914. Serial No. 858,459.

*To all whom it may concern:*

Be it known that I, JOHN B. JOHNSON, a citizen of the United States, residing at Fort Collins, in the county of Larimer and State of Colorado, have invented certain new and useful Improvements in Cultivating-Tools, of which the following is a specification.

This invention relates to improvements in cutting tools for use on cultivators and kindred machines, such as that shown in my application for Patent No. 849,379, filed July 7, 1914, of which the present application is divisional.

The principal object of the present invention is to provide tools of peculiar construction which when moved in a series, across the rows of plants in a field to be cultivated, will quickly and effectively divide the plants into hills and at the same time loosen and work the ground around these hills to facilitate subsequent thinning and to generally improve the condition of the remaining plants.

My invention is particularly adapted to be used in the cultivation of beets and other plants of the same character which ordinarily are hoed into hills and thinned by manual labor. The last mentioned method of cultivation not only requires much time, care and labor, but it leaves the ground around the hills in a hard and smooth condition which makes thinning of the plants very difficult and which is conducive of producing alkali crusts around the plants which retard and impair their growth.

In the accompanying drawings in the various views of which like parts are similarly designated, Figure 1 is a plan view of a cultivator to which my improved cutting tools have been applied, Fig. 2, a face view of one of the cutting tools, Fig. 3, a section taken along the line 3—3, Fig. 2, Fig. 4, a section along the line 4—4, Fig. 3, and Fig. 5, a section taken along the line 5—5, Fig. 3.

Referring to Fig. 1 of the drawings, the numeral 2 designates a suitable carrier including a wheel-supported frame 3, which is adapted to operatively move a series of my improved tools across a field to be cultivated. The frame has at its front end, means for the attachment of draft animals, and it has at its opposite end, a transverse bar 4 on which the cutting tools, together with other parts hereinafter to be described, are assembled.

The cultivating tools 5 are adjustably connected to the bar by means of clamps 6 which permit of their being raised or lowered in accordance with the depth at which it is desired to work the ground. Each of the tools is composed of a blade 7 which projects forwardly at the lower end of a shank 8 which is composed of a straight portion 9 and a curved, lower portion 10 at the extremity of which the blade is attached so as to project forwardly at substantially right angles to the longitudinal axis of the shank. The portion 10 of the shank is sharpened at its front edge, as indicated at 12 in the drawings, for the purpose of dividing the roots, plants and dirt which are dislodged by the action of the blades, and of thereby preventing their accumulation above the latter and consequent interference with the proper operation of the tool. The blade 7 which as stated before, is secured at the lower end of the shank in a forwardly projecting position, is composed of three integral members which in the operation of the machine coöperate to produce the desired results. Two of the members of the blade extend divergently rearwardly from the rear end of the central, forwardly projecting members 13 of the same with which they are formed integral. The function of the middle member 13 is to break the ground for the proper operation of the other members which cut the plants and at the same time loosen the soil between the hills of plants, and it consists with this purpose in view, of a slender, sharp-edged, pointed and slightly tapering tooth which readily penetrates the hardest ground and loosens the same to provide a path for the other laterally projecting members 18. The last-mentioned parts of the blades are like the middle member, of slender and slightly tapering form and their forward edges 19 are sharpened to cut th plants and loosen the soil. The tools are secured to the bar 4 of the machine alternately in two transverse rows, as shown in Fig. 1 of the drawings, preferably in association with protective shields 21 which are disposed between the tools to protect the plants in the hills formed by the action of the blades, from the violent contact of the loosened dirt and stones.

When the machine is drawn across a field to be cultivated, transverse of the rows of plants, with the blades of the tools at the required distance beneath the surface of the soil, the forwardly projecting middle members 13 of the blades, loosen the soil in advance of the divergent knife members 18 which cut the plants along the entire width of the blades, thereby dividing the rows into hills. Inasmuch as the blades loosen and work the earth in close proximity to the hills of plants, subsequent thinning is greatly facilitated and the growth of the remaining plants is at the same time promoted.

The curved, sharp-edged portions of the tool-shanks prevent as hereinbefore explained, the accumulation of dirt, roots and plants on the tools by providing a space rearwardly of the working parts of the same, in which the loosened and severed matter collects to be subsequently cut and thrown aside by contact with the sharpened edges of the shanks.

Having thus described my invention what I claim and desire to secure by Letters-Patent is:

1. A cultivating tool comprising a shank, and at the lower end thereof, a blade composed of a forwardly projecting blade composed of a slender, pointed middle member and two sharp-edged members which extend divergently rearwardly from the rear end of the first-mentioned member.

2. A cultivating tool comprising a shank, and a blade composed of three elongate members which project outwardly from a common point at the end of the shank, one of said members being pointed and extending forwardly from the said point, and the two other members extending rearwardly from the said point at equal angles with relation to the said forwardly extending member and having their forward edg sharpened for the purpose specified.

In testimony whereof I have ffixed my signature in presence of two witnesses.

JOHN B. JOHNSON.

Witnesses:
C. M. LIGGETT,
J. R. WALLACE.